United States Patent
Priebe

(10) Patent No.: US 12,037,444 B2
(45) Date of Patent: Jul. 16, 2024

(54) PHENOLIC RESIN BINDER WITH REDUCED FORMALDEHYDE CONTENT

(71) Applicant: ASK Chemicals GmbH, Hilden (DE)

(72) Inventor: Christian Priebe, Wülfrath (DE)

(73) Assignee: ASK Chemicals GmbH, Hilden (DE)

( * ) Notice: Subject to any disclaimer, the term of this patent is extended or adjusted under 35 U.S.C. 154(b) by 967 days.

(21) Appl. No.: 16/961,467

(22) PCT Filed: Jan. 11, 2019

(86) PCT No.: PCT/DE2019/100024
§ 371 (c)(1),
(2) Date: Jul. 10, 2020

(87) PCT Pub. No.: WO2019/137583
PCT Pub. Date: Jul. 18, 2019

(65) Prior Publication Data
US 2021/0087327 A1   Mar. 25, 2021

(30) Foreign Application Priority Data
Jan. 12, 2018 (DE) ............... 10 2018 100 694.2

(51) Int. Cl.
*C08G 18/54* (2006.01)
*B29C 33/38* (2006.01)
*C08G 8/10* (2006.01)
*C08K 5/07* (2006.01)
*C08K 5/09* (2006.01)
*C08K 5/101* (2006.01)
*C08K 5/11* (2006.01)
*C08K 5/13* (2006.01)

(52) U.S. Cl.
CPC ........ *C08G 18/542* (2013.01); *B29C 33/3807* (2013.01); *B29C 33/3842* (2013.01); *C08G 8/10* (2013.01); *C08K 5/07* (2013.01); *C08K 5/09* (2013.01); *C08K 5/101* (2013.01); *C08K 5/11* (2013.01); *C08K 5/13* (2013.01)

(58) Field of Classification Search
CPC ................................... C08G 18/542
See application file for complete search history.

(56) References Cited

U.S. PATENT DOCUMENTS

| | | | |
|---|---|---|---|
| 3,409,579 A | 11/1968 | Robins | |
| 3,485,797 A | 12/1969 | Robins | |
| 4,268,425 A | 5/1981 | Gardikes | |
| 4,413,931 A * | 11/1983 | McDonald | E02D 3/12 166/295 |
| 4,540,724 A | 9/1985 | Dunnavant et al. | |
| 4,546,124 A | 10/1985 | Laitar et al. | |
| 4,602,069 A | 7/1986 | Dunnavant et al. | |
| 5,358,748 A | 10/1994 | Mathews et al. | |
| 5,447,968 A | 9/1995 | Barnett et al. | |
| 5,795,933 A | 8/1998 | Sharp et al. | |
| 8,563,662 B2 | 10/2013 | Strunk et al. | |
| 2011/0015341 A1 | 1/2011 | Kowatsch et al. | |
| 2018/0126449 A1 | 5/2018 | Vargas et al. | |

FOREIGN PATENT DOCUMENTS

JP   2005264023 A  *  9/2005
WO       0025957 A1     5/2000

* cited by examiner

*Primary Examiner* — Vickey Nerangis
(74) *Attorney, Agent, or Firm* — Standley Law Group LLP; Jeffrey S. Standley; Kenny W. Pung

(57) ABSTRACT

Benzyl ether-type phenolic resins are useful in either a phenolic resin polyurethane cold-box (PUCB) process or a phenolic resin polyurethane no-bake (PUNB) process. The benzyl ether-type phenolic resins contain at least one formaldehyde scavenger in the form of a beta-dicarbonyl compound, and an alpha-carbonyl-carboxyl compound, particularly glyoxylic acid, binders based on these phenolic resins, and isocyanate compounds having at least two isocyanate groups. The resins having the inventive concept exhibit low free formaldehyde content. The inventive concept extends to molding material blends containing the binder, and a method for producing cores, molds or risers.

21 Claims, No Drawings

PHENOLIC RESIN BINDER WITH REDUCED FORMALDEHYDE CONTENT

The present invention concerns benzyl ether-type phenolic resins with reduced formaldehyde content, containing at least one formaldehyde scavenger in the form of a beta-dicarbonyl compound, and also an alpha-carbonyl-carboxyl compound, particularly glyoxylic acid, binders based on these phenolic resins, and isocyanate compounds comprising at least two isocyanate groups for use in a phenolic resin polyurethane cold-box process (PUCB process) and/or a phenolic resin polyurethane no-bake process (PUNB process). The invention also relates to molding material blends containing said binder, and a method for producing cores, molds or risers. In particular, but not necessarily, the polyol component for producing the mold material mixture already contains the β-dicarbonyl compound and compounds with an α-carbonyl-carboxyl structure.

BACKGROUND OF THE INVENTION AND PRIOR ART IN GENERAL

The manufacture of cores and molds using the PUCB and/or the PUNB process has achieved great significance in the foundry industry. Here, two-component polyurethane systems are used to bond a refractory mold base material. The polyol component is comprised of a polyol with at least two OH-groups per molecule, the isocyanate component of an isocyanate with at least two NCO-groups per molecule. Phenol formaldehyde resins are among the polyol components used. Curing the mixture of the mold base material and binder, also referred to as the mold material mixture for brevity, takes place in the PUCB process with the aid of low boiling point tertiary amines which are passed through the mold material mixture after molding in gaseous form or as an aerosol (cf. U.S. Pat. No. 3,409,579). Usually this ensues with the help of a carrier gas, such as air, nitrogen or $CO_2$, into which at least one tertiary amine has been metered. In the PUNB process, addition of liquid tertiary amines and/or metal compounds as catalysts takes place to the mold material mixture.

There was no lack of attempts to lower the formaldehyde content of such phenol formaldehyde resins like resols or phenolic resins of the benzyl ether type, in particular phenol formaldehyde resins, until the concentrations of free formaldehyde is below 0.1 weight percent, in particular below 0.01 weight percent.

U.S. Pat. No. 5,358,748 proposes the use of formaldehyde scavengers for aqueous acidic resols. Heterocyclic nitrogen compounds are used as formaldehyde scavengers; these are diluted with acids (preferably sulphamic acid).

The use of formaldehyde scavengers to reduce the concentration of free formaldehyde is also known for phenol formaldehyde resins from U.S. Pat. No. 5,795,933. β-Dicarbonyl compounds such as 1,3-cyclohexanedione, dimethyl malonate, diethyl malonate, methyl acetoacetate, ethyl acetoacetate, isopropyl acetoacetate, t-butyl acetoacetate or methyl t-butylmalonate are used as formaldehyde scavengers. Volatile solvents can be included as additives.

US 2011/0015341 A1 discloses the manufacture of phenol formaldehyde resins in the presence of formaldehyde scavengers. β-Dicarbonyl compounds are used as formaldehyde scavengers. The phenol formaldehyde resins are produced by base-catalyzed condensation.

WO 2016/165916 A1 describes a phenolic resin composition for use in the polyurethane cold-box and/or no-bake process. The phenolic resin composition comprises an ortho-condensed phenolic resol with etherified and/or free methylol groups in a total concentration of 40 to 60 weight percent and free formaldehyde in a concentration of less than 0.1 weight percent, each with reference to the total mass of the phenolic resin composition, and one or more reaction products of formaldehyde with one or more CH-acid compounds. β-dicarbonyl compounds are disclosed as CH-acid compounds for reducing free formaldehyde. Dimethyl malonate and diethyl malonate are used preferably. Reaction products with the use of a malonic acid ester as a CH-acid starting material including in particular 2-methylene malonate, 2,2-bis(hydroxymethyl) malonate, 2-(hydroxymethyl) malonate and 2-(3-hydroxy-2-oxopropyl) malonate. The fraction of free formaldehyde is specified as less than 0.1 weight percent, preferably less than 0.08 weight percent and most preferably less than 0.05 weight percent, in each case with reference to the phenolic resin composition. No lower limit for free formaldehyde is cited. Preferably, the ortho-condensed phenolic resol is a benzyl ether resin with the following formula (where m/n≥1):

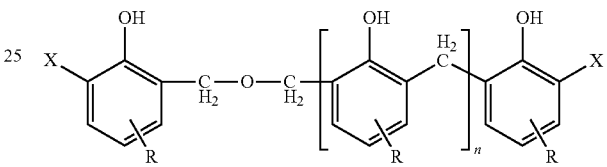

No details are given on the strengths of cured mold materials obtained in this manner. An α-carbonyl-carboxyl compound is not used. Although the concentration of free formaldehyde is reduced by the addition of β-dicarbonyl compounds such as ethyl acetoacetate, unfortunately strength is also reduced as presently documented. This invention is intended to counteract that.

OBJECT OF THE INVENTION

It is the object of the invention to provide a binder based on phenolic resins of the benzyl ether type for use in the phenolic resin/polyurethane cold-box (PUCB) process and/or in the phenolic resin/polyurethane no-bake (PUNB) process, where the phenolic resin composition containing the phenolic resins of the benzyl ether type used as a component of the binder have a very low concentration of free formaldehyde, and the binder should result in high strengths.

SUMMARY OF THE INVENTION

The object above and further objects are solved by the subject matter of the independent claims. Advantageous extensions are the subject matter of the dependent claims or are described below.

The subject of the invention is a binder containing phenolic resins of the benzyl ether type (preferably contained in the polyol component), which preferably has, after use of the formaldehyde scavenger in the form of a β-dicarbonyl compound and the α-carbonyl-carboxyl compound, a free formaldehyde concentration of less than 0.01 weight percent relative to the phenolic resin composition.

Surprisingly, it was found that the free formaldehyde content in phenolic resin compositions, as a starting component of such binders, cannot be reduced arbitrarily without accepting disadvantages in the strengths of the cores and molds produced with them.

Depending on the phenolic resin composition used, containing perhaps solvents and/or additives along with the phenolic resin of the benzyl ether resin type, with low concentrations of this kind for free formaldehyde in the phenolic resin composition there is a reduction of strength for the cured binder or cured mold material mixture respectively produced from it. This is unacceptable. Surprisingly, it was now found that addition of a compound with an α-carbonyl-carboxyl structure can (nearly) restore the strength to the level of a phenolic resin composition with a higher content of free formaldehyde.

The inventive phenolic resin composition thus contains:
phenolic resins of the benzyl ether type;
at least one or more formaldehyde-reducing compound(s) being a β-dicarbonyl structure (having at least two carbonyl groups in the 1 and 3 positions, of which one group is a carbonyl group (—C=O) and the other a carboxyl group (—C(=O)(—O—)) or its conversion products with formaldehyde;
at least one or more compound(s) with an α-carbonyl-carboxyl structure (having at least one carbonyl group in the 2 position with respect to the carboxyl group), preferably glyoxylic acid and its derivatives or conversion products respectively;
with the concentration of free formaldehyde in the phenolic resin composition being in particular less than 0.05 weight percent, probably from 0.0490 weight percent to 0.0050 weight percent, particularly preferably from 0.0099 weight percent to 0.0025 weight percent and most preferably from 0.0090 weight percent to 0.0010 weight percent.

Furthermore, the invention concerns mold material mixtures containing the binder based on phenolic resins of the benzyl ether type, refractory mold base material and isocyanates and possibly catalysts and cores, molds and risers made from the mold material mixtures after hardening. The subject matter of the invention is also the use of the cores, molds and risers for metal casting, in particular iron and aluminum casting.

DETAILED DESCRIPTION OF THE INVENTION

All conventionally used phenolic compounds are suitable for making phenolic resins of the benzyl ether type. Along with unsubstituted phenols, substituted phenols or mixtures of these can be used. The phenol compounds are preferably not substituted either in both ortho positions or not substituted in one ortho position and in the para position. The remaining carbon atoms in the ring can be substituted. The choice of substituents is not particularly limited insofar as the substituent does not adversely influence the reaction of the phenol with the aldehyde. Examples of substituted phenols are alkyl-substituted, alkoxy-substituted, aryl-substituted and aryloxy-substituted phenols.

The basic structure of a phenolic resin of the benzyl either type has, along with —CH$_2$— linked phenol units —CH$_2$—O—CH$_2$— linked phenol units and can be represented as an example (with reference to a product implemented with only formaldehyde) as follows:

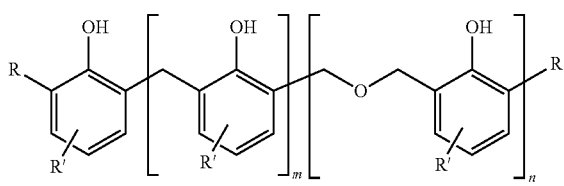

The various units are typically distributed statistically (i.e. also joined in a sequence other than that shown above). The phenol unit can also have a para bond in some cases. Here, R, R' is in each case independent hydrogen (in particular of m and n) or a C1-C26 hydrocarbon substituent (saturated or unsaturated, straight-chained or branched) in an ortho-, meta- or para position with respect to the phenolic hydroxy group; the sum of m and n is at least 2 and the ratio of m:n is at least 1; R is independent hydrogen, —CH$_2$OH or —CH$_2$O—R" with R"=a C1 to C9 hydrocarbon. The R" group can be straight-chained or branched, saturated or unsaturated.

The aforementioned substituents have, for example, 1 to 26, preferably 1 to 15 carbon atoms. Examples of suitable phenols are o-cresol, m-cresol, p-cresol, 3,5-xylenol, 3,4-xylenol, 3,4,5-trimethylphenol, 3-ethylphenol, 3,5-diethylphenol, p-butylphenol, 3,5-dibutylphenol, p-amylphenol, cyclohexylphenol, p-octylphenol, p-nonylphenol, cardanol, 3,5-dicyclohexylphenol, p-crotylphenol, p-phenylphenol, 3,5-dimethoxyphenol and p-phenoxyphenol.

Phenol itself is particularly preferred. Even more highly condensed phenols such as Bisphenol A are suitable. Furthermore, multifunctional phenols are also suitable, i.e. those having more than one phenolic hydroxyl group.

Preferred multifunctional phenols have 2 to 4 phenolic hydroxyl groups. Particular examples of suitable multifunctional phenols are pyrocatechol, resorcinol, hydroquinone, pyrogallol, phloroglucinol, 2,5-dimethylresorcinol, 4,5-dimethylresorcinol, 5-methylresorcinol, cardol or 5-ethylresorcinol. Mixtures of various mono- and multifunctional and/or substituted and/or condensed phenolic components can also be used for making the polyol component.

In one embodiment, phenols of the general Formula I

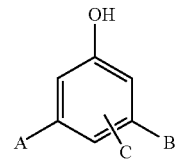

are used to make the phenolic resin component, with A, B and C being chosen independently of one another from: a hydrogen atom, a branched or unbranched alkyl or alkenyl moiety with up to three double bonds which can have, for example, 1 to 26, preferably 1 to 15 carbon atoms, a branched or unbranched alkoxy moiety, which can have, for example, 1 to 26, preferably 1 to 15 carbon atoms, a branched or unbranched alkenoxy moiety, which can have, for example, 1 to 26, preferably 1 to 15 carbon atoms, and an aryl or alkylaryl moiety such as bisphenyls.

Along with formaldehyde, aldehydes with the following formula are also suited as a further aldehyde for making the phenolic resins of the benzyl ether type:

where R is a carbon atom moeity with 1 to 3 carbon atoms, preferably one carbon atom. Particular examples are acetaldehyde and propionaldehyde. Formaldehyde is used with particular preference, either in its liquid form, as paraformaldehyde or trioxane.

In order to obtain phenolic resins of the benzyl ether type, preferably an at least equivalent molar quantity of aldehyde compound is used with reference to the number of moles of the phenolic compounds. The molar ratio of aldehyde compound to phenol compound preferably comprises 1.05:1.0 to 2.5:1, particularly preferably 1.1:1 to 2.2:1, most preferably 1.2:1 to 2.0:1.

According to EP 0177871 A2, aliphatic monoalcohols with one to eight carbon atoms, in particular with one or two carbon atoms, can be added as a further reaction component. Alkoxylation is intended to give the phenol formaldehyde resins greater thermal stability and longer sand service life.

The synthesis of the phenolic resins of the benzyl ether type takes place according to the method familiar to the specialist. Here the phenol and aldehyde are converted in the presence of a divalent metal ion at temperatures of preferably less than 130° C. The water formed is distilled off. A suitable entrainer can be added to the reaction mixture for this, such as toluene or xylene, or the distillation is performed at reduced pressure.

Suitable catalysts for producing phenolic resins of the benzyl ether type are salts of divalent ions of metals such as Mn, Zn, Cd, Mg, Co, Ni, Fe, Pb, Ca and Ba, in particular Zn salts. Zinc acetate is used preferably. The quantity used is not critical. Typical quantities of metal catalyst comprise 0.02 to 0.3 weight percent, preferably 0.02 to 0.18 weight percent with reference to the total quantity of phenol compound and aldehyde compound.

Such resins are described, for example, in U.S. Pat. No. 3,485,797 and EP 1137500 B1; explicit reference is made herewith to the disclosures of these, both with respect to the phenolic resins of the benzyl ether type themselves and with respect to their production.

The free phenol concentration with reference to the weight of the phenolic resin of the benzyl ether type preferably comprises less than 12 weight percent, particularly preferably less than 10 weight percent or even less than 2 weight percent.

According to a further embodiment, the phenolic resin composition can contain free saligenin; the weight ratio of free phenol to free saligenin is preferably 1:1.1 to 1:12, particularly preferably from 1:1.5 to 1:10 and especially from 1:1.8 to 1:8. "Free" in this sense means it is present and "unbonded" in the composition.

The inventively used formaldehyde scavengers are CH-acid compounds in the form of β-dicarbonyl compounds (1,3-dicarbonyl compounds) (I) having one or more of the following groups:

R¹C(=O)—CH₂—C(=O)—O—  (I)

in which
R¹ H,
is a C1 to C12 hydrocarbon, preferably a C1 to C7 hydrocarbon or —CH₂—X, where X is a group which contains, along with hydrogen atoms, 1 to 11 carbon atoms, preferably 1 to 6 carbon atoms, and 1 to 3 oxygen atoms; oxygen can be included, for example, in ether groups. R¹ should not be bonded to the carbon atom of the carbonyl group via an oxygen atom. Examples of R¹ are H, alkyl, alkenyl, aryl, alkylaryl or alkenylaryl groups.

The β-dicarbonyl compounds have in particular the following structure:

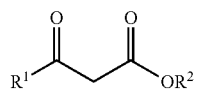

(II)

where
R¹ has the meaning as given above, and
R² is H,
a C1 to C14 hydrocarbon, preferably a C1 to C7 hydrocarbon, where possibly 1 to 3 oxygen atoms can be contained in the hydrocarbon, in ether groups for example. Examples of R² are alkyl, alkenyl, aryl, alkoxy, alkenyloxy or aryloxy groups.

If the CH-acid CH₂ group reacts with formaldehyde, the CH₂ is converted, for example, to a C(—H)(—CH₂—OH) or —C(—CH₂—OH)₂ group. Further conversion products are mentioned in WO 2016/165916 A1 on pages 15 and 16.

It is likewise possible that the β-dicarbonyl compound is one which has multiple β-dicarbonyl groups (I), for example 2 to 4, in particular those according to the formula (II) which are linked via R² and thus have multiple CH acid groups in the molecule (cf. for example CAS 22208-25-9).

CH acidity is the tendency of compound with hydrogen atoms bonded to a carbon atom to donate hydrogen as protons and thus act formally as acids. Unsubstituted alkanes have high pKa values (for example, approximately 50 for ethane). However, if the carbon atom bonded to strongly electrophilic groups such as carbonyls (in an ester, ketone or aldehyde) at the α-position relative to these groups, then the particularly pronounced negative inductive effect ensures that the CH bond at the alpha carbon atom is more polarized and the proton can be cleaved off more easily. According to the present invention, the pKa value of the CH-acidic CH₂ group is preferably less than 15, in particular from 5 to 12.

Malonic acid esters such as diethyl malonate or dimethyl malonate are less suitable, for example. β-Keto esters are preferred. The following β-keto esters are given as examples:
methyl acetoacetate (acetoacetic acid methyl ester, 3-oxobutanoic acid methyl ester—CAS: 105-45-2),

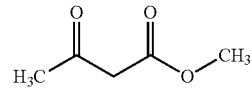

ethyl acetoacetate (acetoacetic acid ethyl ester, 3-oxobutanoic acid ethyl ester—CAS: 141-97-9),

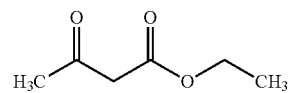

isopropyl acetoacetate (isopropyl 3-oxobutyrate—CAS: 542-08-5),

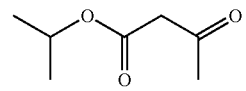

isobutyl acetoacetate (CAS: 7779-75-1),

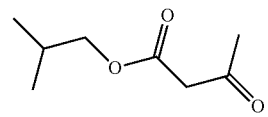

t-butyl acetoacetate (CAS: 1694-31-1),

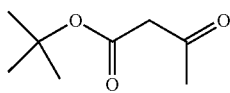

benzyl acetoacetate (CAS: 5396-89-4),

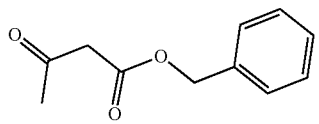

dodecyl acetoacetate (CAS: 52406-22-1),

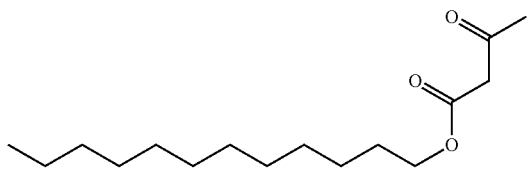 [SMILES: CCCCCCCCCCCCOC(=O)CC(C)=O]

ethyl benzoylacetate (CAS: 94-02-0),

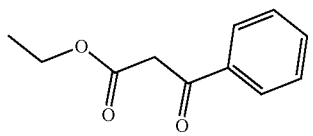

2-methoxyethyl acetoacetate (CAS: 22502-03-0),

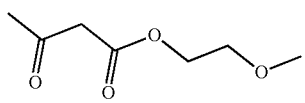

2-acetoacetoxyethyl methacrylate (CAS: 21282-97-3),

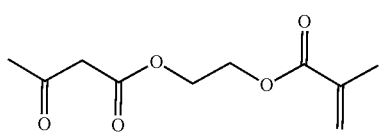

methyl 4-methyl-3-oxopentanoate (CAS: 42558-54-3) and

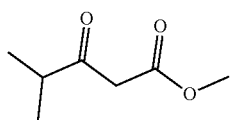

trimethylolpropane trisacetoacetate (CAS: 22208-25-9):

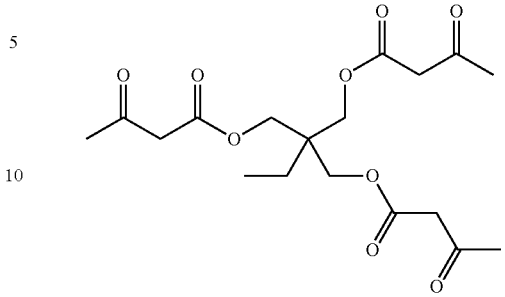

Methyl acetoacetate, ethyl acetoacetate, benzyl acetoacetate, dodecyl acetoacetate, ethyl benzoylacetate, 2-methoxyethyl acetoacetate, 2-(acetoacetoxy)ethyl methacrylate and trimethylolpropane trisacetoacetate are particularly preferred. Methyl acetoacetate, ethyl acetoacetate and trimethylolpropane trisacetoacetate are most preferred.

β-Dicarbonyl compounds (II) containing nitrogen are also suited as formaldehyde scavengers. β-dicarbonyl compounds (I) are used. Examples here are:

N-methyl acetoacetamide (CAS: 20306-75-6),

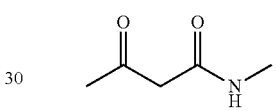

N,N-dimethyl acetoacetamide (CAS: 2044-64-6)

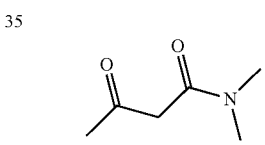

and N,N-diethyl acetoacetamide (CAS:2235-46-3).

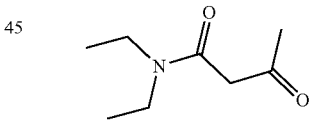

Other formaldehyde scavengers (III) usable in accordance with the invention contain nitrogen in the molecule. Here urea is preferred for use and most preferably ethylene urea and/or propylene urea. These can be used in addition to the β-dicarbonyl compounds (I).

Combinations are possible for the classes of named formaldehyde scavengers (I to III) within a class and/or between classes as long as at least one β-dicarbonyl compound (I) is used.

It is preferred that the phenolic resin of the benzyl ether type already has a low concentration of free formaldehyde prior to the addition of the formaldehyde scavenger. This can be managed by the process control among other things, which requires the use of less formaldehyde scavenger in order to ensure that the limit of less than 0.01 weight percent is achieved in the phenolic resin composition.

The limit of 0.01 weight percent is important, because below this limit of the phenolic resin formulation sensitizing characteristics (triggered by free formaldehyde) are no longer attributed. Thus in terms of occupational safety it is desirable to reduce the concentration of free formaldehyde as much as technically possible.

The preferred concentration of free formaldehyde in the phenolic resin composition or only just the phenolic resin of the benzyl ether type in each case prior to the addition of the formaldehyde scavenger comprises less than 0.25 weight percent, preferably 0.18 to less than 0.25 weight percent, and particularly preferably 0.10 to 0.20 weight percent, in each case with reference (only) to the phenolic resin of the benzyl ether type.

The water concentration of the benzyl ether resin can be managed by the process control. Here the preferable setting is a concentration of 0.2 to 0.9 weight percent, particularly preferably from 0.3 to 0.9 weight percent and most preferably from 0.4 to 0.9 weight percent.

The synthesis of the phenolic resins of the benzyl ether type of the benzyl ether type takes place according to the method known to the specialist. Here the phenol and aldehyde are converted in the presence of a divalent metal ion at temperatures of preferably less than 130° C. The water formed is distilled off. A suitable entrainer can be added to the reaction mixture for this, such as toluene or xylene, or the distillation is performed at reduced pressure. The concentration of the phenol can be changed (in particular, minimized) by means of the entrainer or a steam distillation; thus the ratio of phenol to saligenin can also be changed.

Titrimetric methods cannot be used to determine the free formaldehyde in the inventive low concentrations. An HPLC method is performed here:

Derivatization of the formaldehyde with acetylacetonate and ammonium acetate buffer.
Detector: UV-VIS 413 nm
Column temperature: 50° C.
Flow rate: 1.5 µl/min
Sample volume: 15 µl
Column: reversed phase column, MZ-Analytical Spherisorb ODS-2, C 18 3 µm, Macherey-Nagel Low pressure gradient: water/acetonitrile in various weight fractions The quantity of formaldehyde scavenger with reference to the β-dicarbonyl compounds (I) is not critical and can comprise, for example, up to 1.5 weight percent, preferably 0.1 to 1.0 weight percent and particularly preferably 0.15 to 0.9 weight percent with reference to this phenolic resin composition.

Furthermore, an α-carbonyl-carboxyl compound is used. This contains at least one carbonyl group (C=O) in the α-position (i.e. the 2-position relative to the carboxyl group) to at least one carboxyl group (—C(=O)—O—) and thus has the following structure:

$$R^3—(C=O)—C(=O)—O—R^4 \quad (III)$$

in which
$R^3$ and $R^4$ independently of one another each represent H or a C1 to C6
hydrocarbon, in particular a C1 to C4 hydrocarbon, for example an alkyl or alkenyl group, preferably H, $CH_3$ or $C_2H_5$; it is most preferable that at least one R of $R^3$ and $R^4$ is H, preferably both.

The alkyl group can be linear or branched. The following are particularly suitable: glyoxylic acid (CAS 298-12-4)

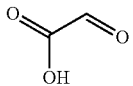

ethyl glyoxylate (CAS: 924-44-7)

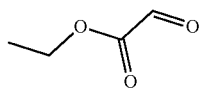

2-oxobutyric acid (CAS: 600-18-0)

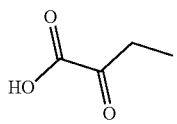

methyl 2-oxobutyrate (CAS: 3952-66-7)

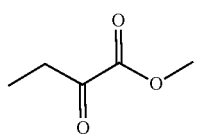

Glyoxylic acid or oxobutyric acid are preferred for use, with glyoxylic acid most preferred. Multiple α-carbonyl-carboxyl compounds can also be used mixed with one another.

The quantity of α-carbonyl-carboxyl compound is not critical and can comprise, for example, 0.01 to 1.0 weight percent, preferably 0.02 to 0.5 weight percent and particularly preferably 0.04 to 0.0999 weight percent with reference to this phenolic resin composition.

It is particularly surprising that the addition of a further acid component such as glyoxylic acid to the phenolic resin composition does not reduce the stability of the polyol component and that in particular the free formaldehyde remains stable and low value over time.

The isocyanate component of the binder system comprises an aliphatic, cycloaliphatic or aromatic monomeric or polymeric isocyanate, preferably with an average of 2 to 5 isocyanate groups per molecule. Depending on the desired properties, mixtures of isocyanates can also be used.

Suitable isocyanates include aliphatic isocyanates, such as hexamethylene diisocyanate, alicyclic isocyanates such as 4,4'-dicyclohexylmethane diisocyanate and dimethyl derivatives thereof. Examples of suitable aromatic isocyanates are toluene-2,4-diisocyanate, toluene-2,6-diisocyanate, 1,5-naphthalene diisocyanate, triphenylmethane triisocyanate, xylene diisocyanate and methyl derivatives thereof, as well as polymethylene polyphenyl isocyanates. Preferred isocyanates are aromatic isocyanates, with polymethylene polyphenyl polyisocyanates preferred in particular, such as technical 4,4'-diphenylmethane diisocyanate, i.e. 4,4'-diphenylmethane diisocyanate with a portion of isomers and higher homologues.

The polyisocyanates can also be derivatized by converting divalent isocyanates capable of forming to bonds with one another in such a way that a portion of their isocyanate groups is derivatized to form isocyanurate, biuret, allophanat, uretdion or carbodiimide groups. Uretdion groups having dimerization products such as MDI or TDI are interesting, for example. However, such derivatized polyisocyanates are preferably used as only one component along with the nonderivatized polyisocyanates above.

Preferably, the isocyanate is used in a quantity where the number of isocyanate groups amounts to 80 to 120% with reference to the number of free hydroxyl groups of the resin.

The phenolic resin component or isocyanate component respectively of the binder system is used preferably as a solution in an organic solvent or a combination of organic solvents. Solvents can thus be required, for example, in order to maintain the components of the binder in a sufficiently low viscosity condition. This is necessary, among other things, in order to obtain uniform cross-linking of the refractory mold material and maintain its free-flowing characteristics.

Known aromatic solvents can be used as a solvent for the phenolic resin composition along with, for example, those solvents designated as naphtha. Starting from benzene, alkyl and/or alkenyl groups are substituted on the aromatic ring, these having a chain length of C1 to C30, preferably from C1 to C20, and with particular preference from C1 to C16. Independent of one another, one to six hydrogen atoms on the benzene ring can be substituted by alkyl and/or alkenyl groups; preferably, 1 to 4, particularly preferably 1 to 3 hydrogens on the ring are substituted. Irrespective of this, the alkyl or alkenyl chain can be straight or branched.

Furthermore, oxygen-rich polar organic solvents can be used. Dicarboxylic acid esters, glycol ether esters, glycol diesters, glycol diethers, cyclic ketones, cyclic esters (lactones), cyclic carbonates or silicic acid esters or their mixtures are particularly suitable. Dicarboxylic acid esters, cyclic ketones and cyclic carbonates are used preferably.

Typical dicarboxylic acid esters have the formula $R^{I}OOC$—$R^{II}$—$COOR^{III}$, in which $R^{II}$ und $R^{III}$ are in each case independent of one another and are an alkyl group with one to 12 carbon atoms, preferably 1 to 6, and $R^{II}$ is a straight-chained or branched hydrocarbon group with 1 to 7 carbon atoms. Examples are dimethyl esters of carboxylic acids with 4 to 6 carbon atoms, which are available, for example, from DuPont with the designation "dibasic ester".

Typical glycol ether esters are compounds with the formula $R^{IV}$—O—$R^{V}$—$OOCR^{VI}$, where $R^{IV}$ is an alkyl group with 1 to 4 carbon atoms, $R^{V}$ is a hydrocarbon group with 2 to 4 carbon atoms and $R^{VI}$ is an alkyl group with 1 to 3 carbon atoms, such as butyl glycol acetate; glycol ether acetates are preferred.

Typical glycol diesters correspondingly have the general formula $R^{IV}COO$—$R^{V}$—$OOCR^{VI}$, where $R^{IV}$ to $R^{VI}$ are defined as above and the groups are selected independently of one another in each case (such as propylene glycol diacetate). Glycol diacetates are preferred. Glycol diethers can be characterized by the formula $R^{IV}$—O—$R^{V}$—O—$R^{VI}$, in which $R_3$ to $R_5$ are defined as above and the groups are selected independently of one another in each case (such as dipropylene glycol dimethyl ether).

Typical cyclic ketones, cyclic esters and cyclic carbonates with 4 to 5 carbon atoms are also suitable (such as propylene carbonate). The carbons can be joined in a branched or unbranched manner and be saturated or unsaturated.

Fatty acid esters—$R^{VII}$—$OOCR^{VIII}$— are also suited with $R^{VIII}$ being a C8 to C32 hydrocarbon and $R^{VII}$ a C1 to C9 hydrocarbon, in particular 1 to 4, such as rapeseed oil fatty acid methyl ester, oleic acid butyl ester and isopropyl esters of various fatty acids.

Silicic acid esters are also suitable in their monomeric form or as oligomers, as is known from WO 2009/130335 A2. Suitable alkyl/alkoxy silanes or alkyl/alkoxy siloxane are, for example, esters of orthosilicic acid in which 1, 2 or 3 alcohol groups are replaced by substituted or unsubstituted hydrocarbon moieties, compounds of the formula $R^{IX}_n Si(OR^{X})_{4-n}$, in which n=1, 2 or 3, with each $R^{X}$ group, referring to an organic group, independent of any further $R^{X}$ group, preferably branched or unbranched C1 to C30 alkyl or aryl, as defined correspondingly in conjunction with the first aspect. Here $R^{IX}$ is a substituted or unsubstituted, branched or unbranched hydrocarbon group and the $R^{IX}$ groups are, in the case of n=2 or 3, the same or different. It is preferred that the $R^{IX}$ groups be substituted or unsubstituted, branched or unbranched C1 to C30 alkyl or substituted or unsubstituted aryl and particularly preferably substituted or unsubstituted, branched or unbranched C1 to C6 alkyl or substituted or unsubstituted C6 to C10 aryl. Unsubstituted, branched or unbranched C1 to C6 alkyl or unsubstituted phenyl is most preferred. Methyl and ethyl are in turn particularly preferred here.

Modified esters are preferred, selected from the group comprised of monoalkyltrialkoxy silanes, dialkyldialkoxy silanes, trialkylmonoalkoxy silanes, monoaryltrialkoxy silanes, diaryldialkoxy silanes, and triarylmonoalkoxy silanes, in which the alkyl groups are preferably C1 to C6 alkyl groups. It is preferred that these be modified esters selected from the group comprised of methyl trimethoxy silane, methyl triethoxy silane, methyl tripropoxy silane, methyl tributoxy silane, ethyl trimethoxy silane, methyl triethoxy silane, ethyl triethoxy silane, n-propyl trimethoxy silane, n-propyl triethoxy silane, isopropyl trimethoxy silane, isopropyl triethoxy silane, vinyl trimethoxy silane, vinyl triethoxy silane, 3-glycidoxipropyl trimethoxy silane, 3-glycidoxipropyl triethoxy silane, 3,4-epoxycyclohexyl trimethoxy silane, dimethoxy dimethyl silane, diethoxy dimethyl silane, diethyl dimethoxy silane and diethyl diethoxy silane. Tetraethylorthosilicate, tetrapropylorthosilicate, their mixtures and their oligomers or mixtures of oligomers are particularly preferred. Tetraethylortho- and tetrapropylortho silicates or mixtures thereof are particularly preferred.

Either aromatic solvents, the aforementioned polar solvents or mixtures thereof are used as a solvent for the isocyanate. Fatty acid esters and silicic acid esters are also suitable.

The solvent fraction in the binder (phenolic resin plus isocyanate component) can comprise up to 50 weight percent.

Along with the constituent already mentioned, the binder systems can contain further additives, such as silanes (for example, as per EP 1137500 B1), internal release agents such as fatty alcohols (for example, as per U.S. Pat. No. 4,602,069), drying oils (for example, as per U.S. Pat. No. 4,268,425), complexing agents (for example, as per U.S. Pat. No. 5,447,968) and additives for extending the processing time (for example, as per U.S. Pat. No. 4,540,724) or mixtures thereof.

Conventional and known materials for producing cast molds and their mixtures can be used as refractory mold base material (also referred to as "mold base material" for brevity below). Examples of suitable materials are quartz sand, zircon sand, chrome ore sand, olivine, vermiculite, bauxite, fireclay and so-called artificial mold base materials, i.e. mold base materials brought into spherical or nearly spherical shape (for example, ellipsoids) by industrial shaping processes.

Examples of this are glass beads, glass granulate or artificial, spherical ceramic sands—so-called Cerabeads® but also Spherichrome®, SpherOX® or "Carboaccucast"—as well as hollow microsphere as they can be isolated, among other things, as a component of fly ash, such as aluminum silicate hollow spheres (microspheres). Mixtures of the refractory materials mentioned are also possible.

Especially preferred are refractory materials which contain more than 50 weight percent of quartz sand with the reference to the mold base material. A refractory mold base material is understood to be one which has a high melting point (melting temperature). Preferably the melting point of the refractory mold base material is greater than 600° C., more preferably greater than 900° C., particularly preferably greater than 1200° C., and most preferably greater than 1500° C.

The refractory mold base material preferably comprises more than 80 weight percent, in particular more than 90 weight percent, and particularly preferably more than 95 weight percent of the mold material mixture.

The average diameter of the refractory mold base materials generally ranges between 100 μm and 600 μm, preferably between 120 μm and 550 μm and with particular preference between 150 μm and 500 μm. The particle size can be determined, for example, by passing through a sieve in accordance with DIN ISO 3310. There is a particular preference for particle shapes with the largest extension of length having a ratio to the smallest extension of length (at right angles to one another and in each case for all spatial directions) of 1:1 to 1:5 or 1:1 to 1:3, i.e. those which are, for example, not fiber-shaped.

The refractory base material is preferably in a free-flowing condition, in particular to be able to process the inventive mold material mixture in conventional core shooters.

Tertiary amines are suitable catalysts. Volatile tertiary amines are used for the PUCB process, such as trimethyl amine ("TMA", CAS RN 75-50-3), dimethyl ethyl amine ("DMEA", CAS 75-64-9), dimethyl isopropylamine ("DMIPA", CAS 996-35-0), dimethyl propylamine ("DMPA", CAS 926-63-6) and triethyl amine ("TEA", CAS RN 121-44-8). Liquid tertiary amines are used for the PUNB process. At room temperature (25° C.) this includes liquid tertiary amines as well as those which become liquid after heating to 40° C., for example, or those which are dissolved in a suitable solvent. Examples are 4-(C1 to C4 alkyl)pyridines, tris(3-dimethylaminopropyl) amine, isoquinoline, aryl pyridines such as phenyl pyridine, pyridine, 5 acridine, 2-methoxypyridine, pyridazine, 3-chloropyridine, quinoline, N-methylimidazole, Nethylimidazole, 4,4'-dipyridine, 4-phenylpropylpyridine, 1-methylbenzimidazole and 1,4-thiazine.

Furthermore, the invention concerns a method for producing mold material mixtures, comprising
(a) mixing of refractory mold base materials with the inventive binder (comprised of at least the phenolic resin composition and the isocyanate component) in a quantity of 0.2 to 5 weight percent, preferably 0.3 to 4 weight percent, particularly preferably 0.4 to 3.5 weight percent with reference to the quantity of refractory mold base materials and a catalyst, added at the same time (in the PUNB process) or separately later (in the PUCB process) to obtain a mold material mixture;
(b) placement of the mold material mixture obtained in Step (a) in a mold tool;
(c) possible addition of the catalyst added separately later (PUCB) and hardening of the mold material mixture in the mold tool with the inventive catalyst to obtain a core or a cast mold; and
(d) subsequent separation of the core or the cast mold from the tool and possibly further hardening.

For the production of the mold material mixture, the components of the binder system can first be combined and then added to the refractory mold base material. However, it is also possible to add the components of the binder to the refractory mold base material at the same time or sequentially in any order.

Conventional methods can be used to achieve a uniform mixture of the components in the mold material mixture. The mold material mixture can also contain other conventional constituents, such as iron oxide, ground flax fibers, sawdust granulate, pitch and refractory metals.

According to the invention, curing can ensue by the PUCB or PUNB method. In the case of the PUCB process, for hardening, a low boiling point tertiary amine is passed through the shaped mold material mixture using an inert carrier gas in gaseous form or as an aerosol. There is no addition of a separate catalyst. All known cold box amine catalysts can be used. In the case of the PUCB process, the amine or metal catalyst can already be dissolved in the binder or mixed with the refractory material as a separate component, with the added amount comprising approximately 0.1 weight percent to approximately 5 weight percent with reference to the mold material mixture.

The mold bodies produced according to this method can have any conventional shape employed in foundries. In one preferred embodiment, the mold bodies are present in the shape of casting molds, cores or risers. These are distinguished by high mechanical stability.

The invention further concerns the use of this mold body for metal casting, in particular casting of iron and aluminum.

The invention is described below in more detail based on preferred embodiments or experimental examples respectively, without being limited to these.

Experimental Examples

Components used (all percentage information is in weight percent).

Phenolic resin of the benzyl ether type 1-o-cresol/phenol/cardanol copolymer), characterized by the following analytical figures: Molecular weight ($M_w$) approximately 900 g/mole, hydroxyl number approximately 560 mg KOH/g, free phenol concentration 1.8%, saligenin concentration 3.8%, free formaldehyde content 0.17 weight percent.

ISOCYANATE COMPONENT 1—a homogeneous mixture of 80% Lupranat M 20 S and 20% linear $C_{10-13}$ alkylbenzene (CAS 67774-74-7), supplied by Sasol
ISOCYANATE COMPONENT 2—a homogeneous mixture of 80% Lupranat M 20 S and 15% linear $C_{10-13}$ alkylbenzene (CAS 67774-74-7), supplied by Sasol and 5% ethyl acetoacetate
KATALYSATOR 706—dimethylpropyl amine, supplied by ASK Chemicals GmbH Quartz sand H 32—supplied by Quarzwerke GmbH
MIRATEC DC 3—water-based sizing agent, flow time 12 sec/4 mm cup, supplied by ASK-Chemicals GmbH
LUPRANAT M 20 S: polymeric MDI, functionality 2.6, supplied by BASF SE
DBE—dimethyl ester mixture of $C_4$-$C_6$ dicarboxylic acids, supplied by DuPont
FSE—fatty acid esters such as distilled rapeseed oil fatty acid methyl ester or isopropyl laurate 98%, supplied by OLEON
Silan 2201 EQ—50% ureidosilane in methanol, supplied by Evonik Industries Diethyl malonate, supplied by Sigma Aldrich
Ethyl acetoacetate (EAA), supplied by Sigma Aldrich
Trimethylolpropane trisacetoacetate, supplied by Sigma Aldrich
Glyoxylic acid, 50% in water, supplied by Sigma Aldrich Synthro Stab TF 501-50% ethylene urea solution in water, supplied by Protex International
Hydrofluoric acid, 40% supplied by Sigma Aldrich
Oxobutyric acid, supplied by AppliChem GmbH
Palmer 1500-1, a mixture of cardanol and cardol, supplied by Palmer International
Benzyl Ether Resin 2

698.4 g phenol (99%), 302.6 g paraformaldehyde (91%) and 0.35 g zinc acetate dihydrate were placed in a reaction vessel equipped with a stirrer, reflux condenser and thermometer. The temperature was increased steadily to 105-115° C. with stirring during 60 minutes and maintained until a refractive index (at 25° C.) of 1.5590 was achieved. The 50 g of Palmer 1500-1 were added, the condenser reconfigured for distillation at atmospheric pressure and the temperature increased to 124-126° C. over the course of an hour. Distillation was continued at this temperature until a refractive index of 1.5940 (at 25° C.) was reached. After that, vacuum was applied and distillation continued at reduced pressure until a refractive index of approx. 1.600 (at 25° C.). Then 10 parts by weight of n-butanol were mixed with each 90 parts by weight of the resin obtained and kept at 122-124° C. under reflux for 60 minutes. Then the unconverted butanol was removed under vacuum. The resin had a refractive index of approx. 1.5970 (at 25° C.), a free phenol concentration of 9.8% and a free formaldehyde concentration of 0.2 weight percent.

Tables 1 and 2 show the phenolic resin compositions produced based on phenolic resins of the benzyl ether type (parts by weight). The free formaldehyde was determined according to the HPLC method specified above.

In a Hobart mixer, a sand mixture comprised of quartz sand H 32 plus 0.60% of the aforementioned binder compositions (in each case individually for the examples A1 to B6) and 0.60% ISOCYANATE COMPONENT was mixed for two minutes until homogeneous. This sand mixture was transferred to a Roeper H 1 core shooter and in each case two cores with a dimension (L×W×H) of 220 mm×22.4 mm×22.4 mm were put in the mold with a closing pressure of 4 bar using compressed air. The sand was hardened using CATALYST 706 (0.5 ml, gassing time 10 sec at 20 bar purging pressure). After hardening, the core was removed and the strength was determined after 15 seconds using a Multiserw L Ru-2e bending device.

To determine the stability of the sizing agent, a 10-minute old core was immersed in the water-based sizing MIRATEC DC 3 for 4 seconds and broken after 30 minutes dwell time at ambient temperature (20° C.) (wet value). Another pair of cores was dried after the sizing for 30 minutes at 150° C. in a circulating air dryer. After 30 minutes at 150° C., the core was removed and the bending strength was determined with the Multiserw unit after cooling to room temperature.

TABLE 3

Shows the strengths (in $N/cm^2$) for mixtures produced from the benzyl ether resin 1. The value 98% represents humidity.

| Phenolic resin component | Immediate, 15 sec | 24 h | 24 h 98% | Water-based sizing agent wet | dry |
|---|---|---|---|---|---|
| A1 | 185 | 328 | 267 | 268 | 387 |
| A2 | 182 | 325 | 270 | 265 | 388 |
| A3 | 186 | 330 | 255 | 260 | 375 |
| A4 | 160 | 240 | 80 | 91 | 166 |
| B1 | 180 | 315 | 205 | 221 | 328 |
| B2 | 180 | 322 | 218 | 223 | 335 |
| B3 | 180 | 330 | 221 | 228 | 346 |
| B4 | 178 | 331 | 211 | 215 | 350 |
| B5 | 175 | 328 | 221 | 230 | 356 |
| B6 | 180 | 326 | 218 | 222 | 358 |

Tables 1 to 3 show that the limit of 0.01 weight percent free formaldehyde is reached by the addition of the β-keto ester. This particularly reduces the 24 hour strengths, which can be increased again, surprisingly, by addition of glyoxylic acid or oxobutyric acid. Tables 1 and 3 also show that usable strengths can in fact be achieved by diethyl malonate (example A2), but the free formaldehyde concentration cannot be reduced to the desired limit of less than 0.01 weight percent If one uses the ISOCYANATE COMPONENT 2 for the examples A1 to A4 and B1 to B6 instead of ISOCYANATE COMPONENT 1, then the same trends result as shown in Table 3 for the determination of strengths.

TABLE 1

|  | Not according to the invention | | | | According to the invention | | | | | |
|---|---|---|---|---|---|---|---|---|---|---|
|  | A1 | A2 | A3 | A4 | B1 | B2 | B3 | B4 | B5 | B6 |
| Benzyl ether resin 1 | 50.00 | 50.00 | 50.00 | 50.00 | 50.00 | 50.00 | 50.00 | 50.00 | 50.00 | 50.00 |
| DBE | 24.70 | 23.70 | 24.50 | 24.35 | 24.45 | 24.25 | 24.05 | 23.85 | 24.00 | 24.15 |
| FSE | 24.70 | 23.70 | 24.50 | 24.35 | 24.35 | 24.25 | 24.05 | 23.85 | 24.00 | 24.15 |
| Diethyl malonate |  | 2.00 |  |  |  |  |  |  |  |  |
| EAA |  |  |  | 0.70 | 0.40 | 0.70 | 0.70 | 0.70 | 1.20 | 0.40 |
| Synthro Stab TF 501 |  |  |  |  |  |  |  |  |  | 0.50 |
| Silan 2201 EQ | 0.50 | 0.50 | 0.50 | 0.50 | 0.50 | 0.50 | 0.50 | 0.50 | 0.50 | 0.50 |
| Hydrofluoric acid, 40% | 0.10 | 0.10 | 0.10 | 0.10 | 0.10 | 0.10 | 0.10 | 0.10 | 0.10 | 0.10 |
| Glyoxylic acid, 50% |  |  | 0.40 |  | 0.20 | 0.20 | 0.60 | 1.00 | 0.20 | 0.20 |
| Free formaldehyde (%) | 0.085 | 0.040 | 0.082 | 0.003 | 0.009 | 0.005 | 0.004 | 0.004 | 0.001 | 0.002 |

TABLE 2

|  | Not according to the invention | According to the invention | | | | | | |
|---|---|---|---|---|---|---|---|---|
|  | A5 | B7 | B8 | B8 | B10 | B11 | B12 | B13 |
| Benzyl ether resin 2 | 50.00 | 50.00 | 50.00 | 50.00 | 50.00 | 50.00 | 50.00 | 50.00 |
| DBE | 24.70 | 24.25 | 24.15 | 23.80 | 24.25 | 24.15 | 23.80 | 23.80 |
| FSE | 24.70 | 24.25 | 24.15 | 23.80 | 24.25 | 24.15 | 23.80 | 23.80 |
| Trimethylolpropane trisacetoacetate |  |  |  |  | 0.70 | 0.90 | 1.20 |  |
| EAA |  | 0.70 | 0.90 | 1.20 |  |  |  | 0.70 |
| Silan 2201 EQ | 0.50 | 0.50 | 0.50 | 0.50 | 0.50 | 0.50 | 0.50 | 0.50 |
| Hydrofluoric acid, 40% | 0.10 | 0.10 | 0.10 | 0.10 | 0.10 | 0.10 | 0.10 | 0.10 |
| Glyoxylic acid, 50% |  | 0.20 | 0.20 | 0.60 | 0.20 | 0.20 | 0.60 |  |
| Oxobutyric acid |  |  |  |  |  |  |  | 0.20 |
| Free formaldehyde (%) | 0.099 | 0.009 | 0.007 | 0.006 | 0.009 | 0.006 | 0.005 | 0.009 |

The invention claimed is:

1. A phenolic resin composition, comprising the following components:
   a polyol component, wherein the polyol component is a phenolic resin of the benzyl ether type;
   a beta-dicarbonyl compound comprising the following group (I):

$$R^1C(=O)-CH_2-C(=O)-O-\qquad\text{(I)}$$

wherein $R^1$ is selected from H, a C1 to C12 hydrocarbon and $-CH_2-X$, where X is a group comprising, along with hydrogen atoms, 1 to 11 carbon atoms, and 1 to 3 oxygen atoms, the beta-dicarbonyl compound serving as a formaldehyde scavenger or comprising a conversion product of the beta-dicarbonyl compound with formaldehyde or both; and further comprising:
   an alpha-carbonyl-carboxyl compound with the following structure (III):

$$R^3O-(O=)C-C(=O)-R^4\qquad\text{(III)}$$

wherein each of $R^3$ and $R^4$, independently of one another, is selected from H, a C1 to C6 hydrocarbon, or comprising a conversion product of the alpha-carbonyl-carboxyl compound with at least one further component of the phenolic resin composition or both.

2. The phenolic resin composition according to claim 1, wherein:
   free formaldehyde, if present in the phenolic resin composition after conversion with the beta-dicarbonyl compound, is less than or equal to 0.25 weight percent.

3. The phenolic resin composition of claim 1, wherein:
   the beta-dicarbonyl compound is chosen from at least one member of the group consisting of: methyl acetoacetate, ethyl acetoacetate, isopropyl acetoacetate, isobutyl acetoacetate, t-butyl acetoacetate, benzyl acetoacetate, dodecyl acetoacetate, ethyl benzoylacetate, 2-methoxyethyl acetoacetate, 2-(acetoacetoxy) ethyl methacrylate, methyl 4-methyl-3-oxopentanoate and trimethylolpropane trisacetoacetate.

4. The phenolic resin composition of claim 1 the alpha-carbonyl-carboxyl compound is chosen from at least one member of the group consisting of: glyoxylic acid, ethyl glyoxylate, 2-oxobutyric acid and methyl 2-oxobutyrate.

5. The phenolic resin composition of claim 1, wherein: the phenolic resin of the benzyl ether type comprises 0.2 to 0.9 weight percent water.

6. The phenolic resin composition of claim 1, wherein: the beta-dicarbonyl compound, or a conversion product thereof, is contained in the composition in a quantity of 0.1 to 1.5 weight percent.

7. The phenolic resin composition of claim 1, wherein: the alpha-carbonyl-carboxyl compound is contained in the composition in a quantity of 0.01 to 1.0 weight percent.

8. The phenolic resin composition of claim 1, wherein the phenolic resin of the benzyl ether type has a hydroxyl number, as measured according to standard test method DIN 53240 of 500 to 900 mg KOH/g.

9. The phenolic resin composition of claim 1, wherein:
   the phenolic resin of the benzyl ether type has an average molecular weight measured as the weight average according to standard test method DIN 5567-1 using gel permeation chromatography (GPC) of 500 to 1100 g/mol determined without phenol and monomeric phenol/formaldehyde addition products.

10. The phenolic resin composition of claim 1, wherein:
    the phenolic resin composition has a free phenol concentration of less than 12 weight percent with reference to the phenolic resin of the benzyl ether type.

11. The phenolic resin composition of claim 1, further comprising:
    saligenin in a weight ratio of free phenol to saligenin of 1:1.1 to 1:12.

12. The phenolic resin composition of claim 1, further comprising:
    at least one of: dicarboxylic acid esters and fatty acid esters, as a solvent for the polyol component.

13. The phenolic resin composition of claim 1, wherein: the phenolic resin of the benzyl ether type amounts to 30 to 90 weight percent, of the phenolic resin composition.

14. The phenolic resin composition of claim 1, wherein: the phenolic resin of the benzyl ether type, including any solvent and diluent, amounts to more than 95 weight percent of the phenolic resin composition.

15. A binder composition, comprising:
    the phenolic resin composition according to claim 1; and
    an isocyanate component comprising one or more isocyanate compounds with at least 2 isocyanate groups per molecule.

16. The binder according to claim 15, wherein the binder comprises, independently of each other,
    phenolic resin of the benzyl ether type, from 8 to 70 weight percent;
    isocyanate compounds; from 13 to 78 weight percent; and
    solvent for the phenolic resin of the benzyl ether type and the isocyanate compounds, 2 to 57 weight percent.

17. d) A mold material mixture, comprising:
    the components of the binder according to claim 15; and
    a refractory mold base material, selected from at least one member of the group consisting of: olivine, fireclay, bauxite, aluminum silicate hollow spheres, glass beads, glass granulate, synthetic ceramic mold base materials and silicon dioxide.

18. The mold material mixture according to claim 17, wherein:
the binder is provided as a kit comprising, separated from each other, the isocyanate compounds as one component and the phenolic resin of the benzyl ether type as a further component.

19. A method for producing a mold body as a casting mold, core or riser, comprising the steps of
(i) manufacturing the mold material mixture according to claim 17;
(ii) introducing the mold material mixture or its components into a mold tool;
(iii) hardening of the mold material mixture in the mold tool with at least one tertiary amine in order to obtain a hardened self-supporting mold body; and
(iv) subsequent separation of the hardened self-supporting mold body from the tool and possible further hardening, by means of which one obtains a cured mold body.

20. The method according to claim 19, in which the tertiary amine is selected from one or more members of the group consisting of: trimethylamine, dimethylethylamine, dimethyl-n-propylamine, dimethylisopropylamine, diethylmethylamine, triethylamine, tri-n-propylamine, triisopropylamine, tri-n-butylamine, triisobutylamine, 4-(C1 to C4 alkyl)pyridines, tris(3-dimethylaminopropyl)amine, isoquinoline, aryl pyridines; phenylpyridine, pyridine, acridine, 2-methoxypyridine, pyridazine, 3-chloropyridine, quinoline, N-methylimidazole, N-ethylimidazole, 4,4'-dipyridine, 4-phenylpropylpyridine, 1-methylbenzimidazole and 1,4-thiazine.

21. A casting mold, core or riser manufactured according to the method of claim 19.

* * * * *

UNITED STATES PATENT AND TRADEMARK OFFICE
CERTIFICATE OF CORRECTION

PATENT NO. : 12,037,444 B2  
APPLICATION NO. : 16/961467  
DATED : July 16, 2024  
INVENTOR(S) : Christian Priebe Page 1 of 1

It is certified that error appears in the above-identified patent and that said Letters Patent is hereby corrected as shown below:

In the Specification

Column 2, Lines 22-30, please delete " " and insert " "

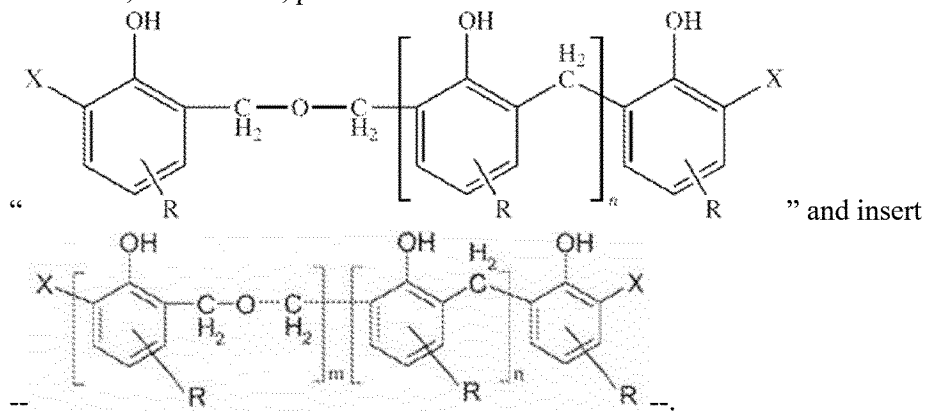

Signed and Sealed this  
Third Day of June, 2025

Coke Morgan Stewart  
*Acting Director of the United States Patent and Trademark Office*